United States Patent
Ho et al.

(10) Patent No.: US 7,020,150 B2
(45) Date of Patent: Mar. 28, 2006

(54) SYSTEM, DEVICE, AND METHOD FOR TRAFFIC AND SUBSCRIBER SERVICE DIFFERENTIATION USING MULTIPROTOCOL LABEL SWITCHING

(75) Inventors: Ka K. Ho, Kanata (CA); Greg A. Wilbur, Ottawa (CA); Bill B. Fong, Stittsville (CA)

(73) Assignee: Nortel Networks Limited, (CA)

( * ) Notice: Subject to any disclaimer, the term of this patent is extended or adjusted under 35 U.S.C. 154(b) by 671 days.

(21) Appl. No.: 10/081,987

(22) Filed: Feb. 22, 2002

(65) Prior Publication Data

US 2003/0161264 A1 Aug. 28, 2003

(51) Int. Cl.
*H04J 3/14* (2006.01)
(52) U.S. Cl. ..................................... 370/412
(58) Field of Classification Search ............... 370/228, 370/230, 231, 232, 235, 235.1, 236, 524, 370/522, 252, 254, 351, 352, 395.1, 412–419, 370/428, 389, 401, 403
See application file for complete search history.

(56) References Cited

U.S. PATENT DOCUMENTS

| | | | | |
|---|---|---|---|---|
| 6,363,319 | B1 * | 3/2002 | Hsu ........................... | 701/202 |
| 6,385,170 | B1 * | 5/2002 | Chiu et al. .................. | 370/235 |
| 6,614,781 | B1 * | 9/2003 | Elliott et al. ................ | 370/352 |
| 2001/0046208 | A1 | 11/2001 | Eng et al. | |
| 2002/0012348 | A1 | 1/2002 | Mizuhara et al. | |
| 2002/0097730 | A1 | 7/2002 | Langille et al. | |

FOREIGN PATENT DOCUMENTS

| | | |
|---|---|---|
| EP | 1093266 A2 | 4/2001 |
| EP | 1324552 A2 | 7/2003 |

OTHER PUBLICATIONS

PCT International Search Report PCT/US03/05481.
Kankkunen, MPLS and Next Generation Access Networks, IEEE Serial Publication Oct. 2, 2000, pp. 5-16.
ATM-MPLS Network Interworking Version; ATM Forum Technical Committe, vol. AF-AIC-178.0000, Aug. 20001, pp. 1-23.
Jensen et al., MPLS IP Quality of Service, Las Vegas Interopnet Labs MPLS Tutorial, May 5, 2000.
Rosen, et al., IETF RFC 3031, Multiprotocol Label Switching Architecture, Jan. 2001.
Andersson, et al., IETF RFC 3036, LDP Specification, Jan. 2001.
Rosen, et al., IETF RFC 3032, MPLS Label Stack Encoding, Jan. 2001.
Rosen, et al., Draft-ieft-ppvpn-l2vpn-00, An Architecture For L2VPNs, Jul. 2001.
Ould-Brahim, et al., Draft-ouldbrahim-l2vpn-lpe-01, VPLS/LPE L2VPNs: Virtual Private LAN Services Using Logical PE Architecure, Nov. 2001.

(Continued)

*Primary Examiner*—Dang Ton
(74) *Attorney, Agent, or Firm*—McGuinness & Manaras LLP

(57) ABSTRACT

A system, device, and method for traffic and subscriber service differentiation using multiprotocol label switching (MPLS) creates different service tiers, where each service tier is associated with a unique combination of resource class (color) and hold priority. Enhanced MPLS devices separate traffic into separate queues based upon service tier. Standard MPLS devices are typically configured to separate traffic for different service tiers under normal operating conditions. Enhanced MPLS devices signal service tier using a predetermined signaling protocol such as RSVP-TE or CR-LDP.

19 Claims, 4 Drawing Sheets

OTHER PUBLICATIONS

Ould-Brahim, et al., Draft-ietf-ppvpn-vpn-vr-01, Network Based IP VPN Architecture Using Virtual Routers, Nov. 2001.

Martini, et al., Draft-martini-l2circuit-trans-mpls-08, Transport of Layer 2 Frames Over MPLS, Nov. 2001.

Lasserre, et al., Draft-lasserre-vkompella-ppvpn-vpls-00, Transparent VLAN Services Over MPLS, Nov. 2001.

Jamoussi, et al., Draft-ietf-mpls-cr-ldp-06, Constraint-Based LSP Setup Using LDP, Nov. 2001.

Awduche, et al., IETF RFC 3209, RSVP-TE: Extensions to RSVP for LSP Tunnels, Dec. 2001.

Rosen, et al., Draft-ietf-ppvpn-rfc2547bis-01, BGP/MPLS VPNs, Jan. 2002.

Khandekar, et al., Draft-khandekar-ppvpn-hvpls-mpls-00, Hierarchical Virtual Private LAN Service, Nov. 2001.

Kompella, et al., Draft-kompella-ppvpn-dtls-01, Decoupled Virtual Private LAN Services, Nov. 2001.

Kompella, et al., Draft-kompella-ppvpn-l2vpn-01, Layer 2 VPNs Over Tunnels, Nov. 2001.

* cited by examiner

FIG 2     200

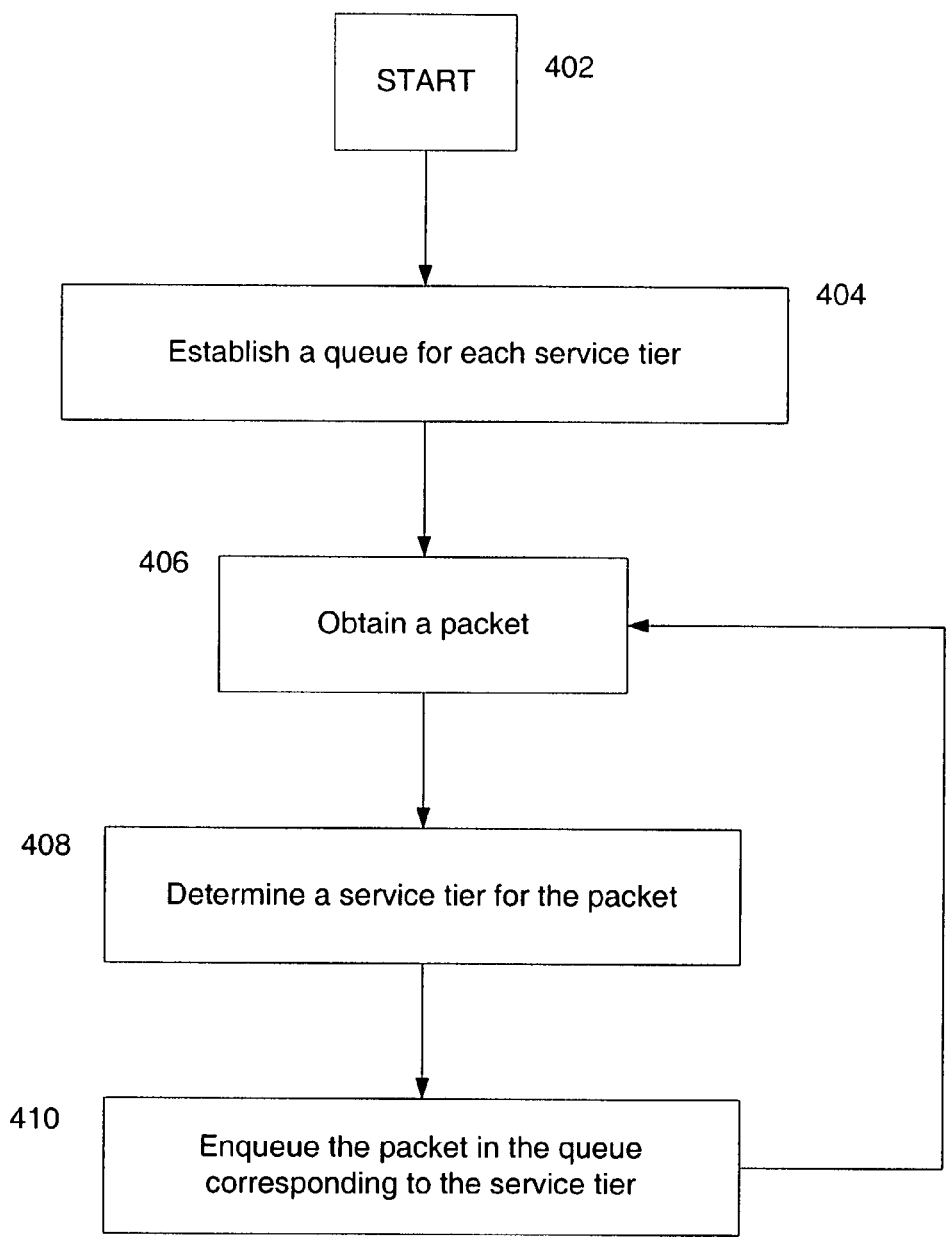
FIG. 4    400

SYSTEM, DEVICE, AND METHOD FOR TRAFFIC AND SUBSCRIBER SERVICE DIFFERENTIATION USING MULTIPROTOCOL LABEL SWITCHING

FIELD OF THE INVENTION

The present invention relates generally to multiprotocol label switching (MPLS), and more particularly to traffic and subscriber service differentiation using MPLS.

BACKGROUND OF THE INVENTION

In today's information age, communication devices, such as computers and computer peripherals, are often internetworked over a communication network. A common networking model routes packets of information within the communication network using a networking protocol such as the Internet Protocol (IP) or other network layer protocol. Some networking protocols, such as IP, are considered to be "connectionless" networking protocols. In a connectionless networking protocol, each packet of information includes a network layer address, and each router forwards the packet of information based upon the network layer address according to predetermined signaling and routing protocols, such as the Open Shortest Path First (OSPF) protocol, the Routing Information Protocol (RIP), Hello, Border Gateway Protocol (BGP), RSVP, or other routing protocol.

Thus, each router makes an independent forwarding decision for the packet based upon the network layer address. Essentially, each router partitions the entire set of network layer addresses into a number of Forwarding Equivalence Classes (FECs), and each FEC is mapped to a particular outgoing path (or set of paths, in the case of multi-path routing) based upon the routing protocol. The router determines an FEC for each packet of information based upon the network layer address of the packet, and forwards the packet of information to the corresponding outgoing path (or set of paths).

Network layer routing requires each router to process each packet of information at the network layer. This is an expensive and time-consuming operation that limits the performance of some routers and even prevents certain devices that do not support the networking protocol from performing routing and other functions on the packets.

Label switching can be used to eliminate the network layer processing by certain devices in the communication network. Label switching enables a packet to be transported across a network domain (referred to hereinafter as an "autonomous system" or "AS") using labels rather than the network layer address. Specifically, a label switched path (LSP) is established from an ingress point border device to an egress point border device (often referred to individually as a "Label Edge Router" or "LSR") in the AS. The LSP traverses a number of intermediate label switching devices (often referred to individually as a "Label Switching Router" or "LSR"). When the packet enters the ingress LER, the ingress LER uses the network address to assign the packet to a particular FEC, and inserts the corresponding label into the packet, specifically within a label header. Each intermediate LSR along the LSP forwards the packet based upon the label. The egress LER removes the label from the packet and forwards the packet based upon the network address. Thus, only the LERs process the packet at the network layer, while the LSRs process the packet based upon the label only.

In order to establish and remove LSPs, the various label switching devices exchange label switching information using a signaling protocol. Label switching information can be exchanged using a dedicated label distribution protocol, or can be exchanged ("piggy-backed") in other signaling and routing protocols, such as OSPF, IS-IS, and RIP.

Each label switching device maintains mapping information for mapping each FEC to a corresponding label. The label mapping information is typically maintained in the various forwarding/routing tables maintained by the label switching device. It is common for the label switching device to maintain a forwarding table for each incoming interface and a forwarding table for each outgoing interface. The label mapping information maintained by the label switching device in the incoming forwarding tables enables the label switching device to quickly forward received packets that include label switching information. The label mapping information maintained by the label switching device in the outgoing forwarding tables enables the label switching device to insert label switching information into packets. For convenience, a forwarding table that includes label mapping information may be referred to as a label information base (LIB).

An architecture for multi-protocol label switching (MPLS) is discussed in E. Rosen et. al., Multiprotocol Label Switching Architecture, Internet Engineering Task Force (IETF) Request For Comments (RFC) 3031, January 2001, which is hereby incorporated herein by reference in its entirety. One signaling protocol for exchanging label switching information for MPLS is commonly known as the Label Distribution Protocol (LDP). LDP is described in L. Andersson et. al., LDP Specification, Internet Engineering Task Force (IETF) Request For Comments (RFC) 3036, January 2001, which is hereby incorporated herein by reference in its entirety. An encoding technique for producing and processing labeled packets for MPLS is described in E. Rosen et. al., MPLS Label Stack Encoding, Internet Engineering Task Force (IETF) Request For Comments (RFC) 3032, January 2001, which is hereby incorporated herein by reference in its entirety.

MPLS can be used for providing Virtual Private Network (VPN) services. A VPN is commonly defined as an overlay network that is built over a public network infrastructure that provides the VPN user (client) a secure, private connection using tunneling, encryption, and authentication. VPNs can be built at layer 2 (L2) of the network, for example using technologies like X.25, Frame Relay, or ATM, or at layer 3 (L3) of the network, for example, over the Public Internet using the Internet Protocol (IP). For convenience, VPNs built at layer 2 of the network are often referred to as L2 VPNs, while VPNs built at layer 3 of the network using IP are often referred to as L3 VPNs or IP VPNs. Various architectures of L2 and L3 MPLS based VPNs are described in the following IETF drafts, which are hereby incorporated herein by reference in their entireties: draft-martini-12circuit-trans-mpls-08, draft-ietf-ppvpn-rfc2547bis-01, draft-ietf-ppvpn-12vpn-00, draft-kompella-ppvpn-12vpn-01, draft-lasserre-vkompella-ppvpn-vpls-00, draft-kompella-ppvpn-dtls-01, draft-khandekar-ppvpn-hvpls-mpls-00, draft-ouldbrahim-12vpn-lpe-01, and draft-ietf-ppvpn-vpn-vr-01.

A typical multi-service packet network supports different classes of traffic. For example, a MPLS-based VPN may support real-time voice and video traffic as well as best effort data traffic. In order to support different classes of traffic, different forwarding behaviors are typically applied to the different classes of traffic. An example of different forwarding behavior is queue scheduling priority. Specifically, a packet carrying real-time voice should be forwarded before a packet carrying best effort data, thereby resulting in less delay for the real-time packet.

A multi-service packet network may also offer subscribers different levels of service (i.e., service availability and quality). For example, a telecom carrier typically offers subscribers different levels of service, thereby allowing the telecom carrier to charge subscribers different tariff rates. Carriers can use this flexibility in tariff rates to bid aggressively when dealing with low-end subscribers while also offering excellent service to high-end subscribers. Different levels of service may experience different degrees of service availability and bandwidth guarantees. Within each level of service, it is still necessary to handle the different classes of traffic appropriately.

Different classes of traffic and different levels of service can be supported through careful traffic engineering and network management followed with active monitoring to ensure that the subscriber Service Level Agreements (SLAs) are met. For example, MPLS LSPs bearing traffic from a premium "Gold" service could be routed through uncongested portions of the network using manually provisioned Explicit Routes. These premium LSPs could be monitored to ensure the SLAs are met. Network administrators could "tweak" these LSPs or add network capacity and equipment to address any problems. Although this approach is relatively simple, it has considerable administrative costs. Specifically, traffic engineering and management rely on salaried network administrators. Furthermore, it is unclear how rapidly human operators can react to changes to network topology that affect subscriber service.

Global application of priority across all class types can prevent the service provider from offering bandwidth guarantees to any traffic class. This is because connections of higher priority traffic classes can preempt all connections of a lower priority traffic class. Bandwidth can be guaranteed on a traffic class basis, although such a solution does not provide for different levels of service for a particular class of traffic.

Separate networks can be used to support different classes of traffic and different levels of service. In this model of operation, subscribers that receive the same level of service share a network. Within each network, Differentiated Services (DiffServ) or other techniques are used to provide differentiation between different classes of traffic, such as voice, video, and elastic data. This does not imply that the service provider operates completely separate physical networks. A service provider could choose to construct logically separate networks, for example, using virtual routers. However, this strategy greatly increases the administrative complexity (and hence the cost) of operating the service provider's network. Specifically, if N routers are required to support a service for a single service level and there are S service levels, up to O(SN) virtual routers would be required deliver service. This translates into increased router provisioning, increased network complexity when performing network QAM, and increased workload in network planning. Furthermore, a strategy of separate networks does not adequately address the issue of differentiation on availability. In particular MPLS LSPs bearing traffic from a premium service cannot preempt LSPs bearing traffic from an inferior service.

In order to avoid the administrative complexity of managing separate physical or logical networks, service level differentiation can be accomplished using resource class (color), preemption priority, and link cost management. Specifically, links can be assigned to one or more resource classes, essentially "coloring" the link. In MPLS signaling protocols like RSVP-TE and CR-LDP, LSPs can be restricted to using links that have certain colors. Traffic of LSPs that serve subscribers of different levels of service can be separated by assigning them different administrative groups such that the LSPs are routed over different physical links. These LSPs can employ an existing technique, such as Differentiated Services (DiffServ), for traffic class differentiation for real time versus data applications. However, to address the issue of differentiation on availability, it is necessary to permit LSPs of a premium service to preempt LSPs of an inferior service. This can be achieved through a combination of color, preemption priority, and link cost management. Specifically, with reference to an example with a premium "Gold" service and a non-premium service, certain links are reserved for premium service by marking them usable by LSPs with only the "Gold" color, assigning these links low link costs, and engineering these links to be sufficiently large to carry offered "Gold" LSPs, while other links are marked usable by both premium and non-premium services by marking them usable by both "Gold" LSPs and other color LSPs and assigning these links higher link costs in order to prevent their use by "Gold" LSPs under normal conditions. With proper provisioning and engineering based on the guidelines above, under normal conditions, premium "Gold" LSPs are run entirely on "Gold" colored links and are isolated from non-premium traffic. Under network failure conditions, Gold LSPs can preempt non-premium LSPs on links marked with "Gold" and other colors corresponding to non-premium services. One problem with this solution is that, under network failure conditions, it is possible that LSPs of the premium service are mixed together with non-premium LSPs in the same link. Thus, any differentiation on the basis of forwarding quality provided in terms of different bandwidth guarantees may be lost during a failure condition. This solution also involves administratively complex rules for engineering and provisioning links.

SUMMARY OF THE INVENTION

In accordance with one aspect of the invention, traffic and subscriber service differentiation using multiprotocol label switching (MPLS) creates different service tiers, where each service tier is associated with a unique combination of resource class (color) and hold priority. Enhanced MPLS devices separate traffic into separate queues based upon service tier. Standard MPLS devices are typically configured to separate traffic for different service tiers under normal operating conditions. Enhanced MPLS devices signal service tier using a predetermined signaling protocol such as RSVP-TE or CR-LDP.

In accordance with another aspect of the invention, traffic and service differentiation is accomplished automatically within enhanced MPLS devices in the MPLS network. As opposed to a solution that requires exclusively manual network administration, this solution can react faster than human operators and reduce the administrative costs of offering the service.

In accordance with another aspect of the invention, multiple traffic classes are provided. Bandwidth can be supplied on a service tier and traffic class basis rather than on just a traffic class basis so as to provide for different levels of service for a particular class of traffic. Bandwidth guarantees can be supplied to the highest service tier that is not subject to preemption.

In accordance with another aspect of the invention, traffic and subscriber service differentiation is accomplished using a single unified MPLS network as opposed to multiple networks. This results in less provisioning and network administration and allows preemption of connections of inferior service tiers by connections of premium service tiers.

In accordance with another aspect of the invention, queue separation is retained between service levels under all operating conditions and does not require complex rules on how to engineer and configure links, as opposed to a solution based upon color, priority, and link cost management.

BRIEF DESCRIPTION OF THE DRAWINGS

In the accompanying drawings:

FIG. 4 is a logic flow diagram showing exemplary traffic/service differentiator logic in accordance with an embodiment of the present invention.

DETAILED DESCRIPTION OF A PREFERRED EMBODIMENT

Figure 1:
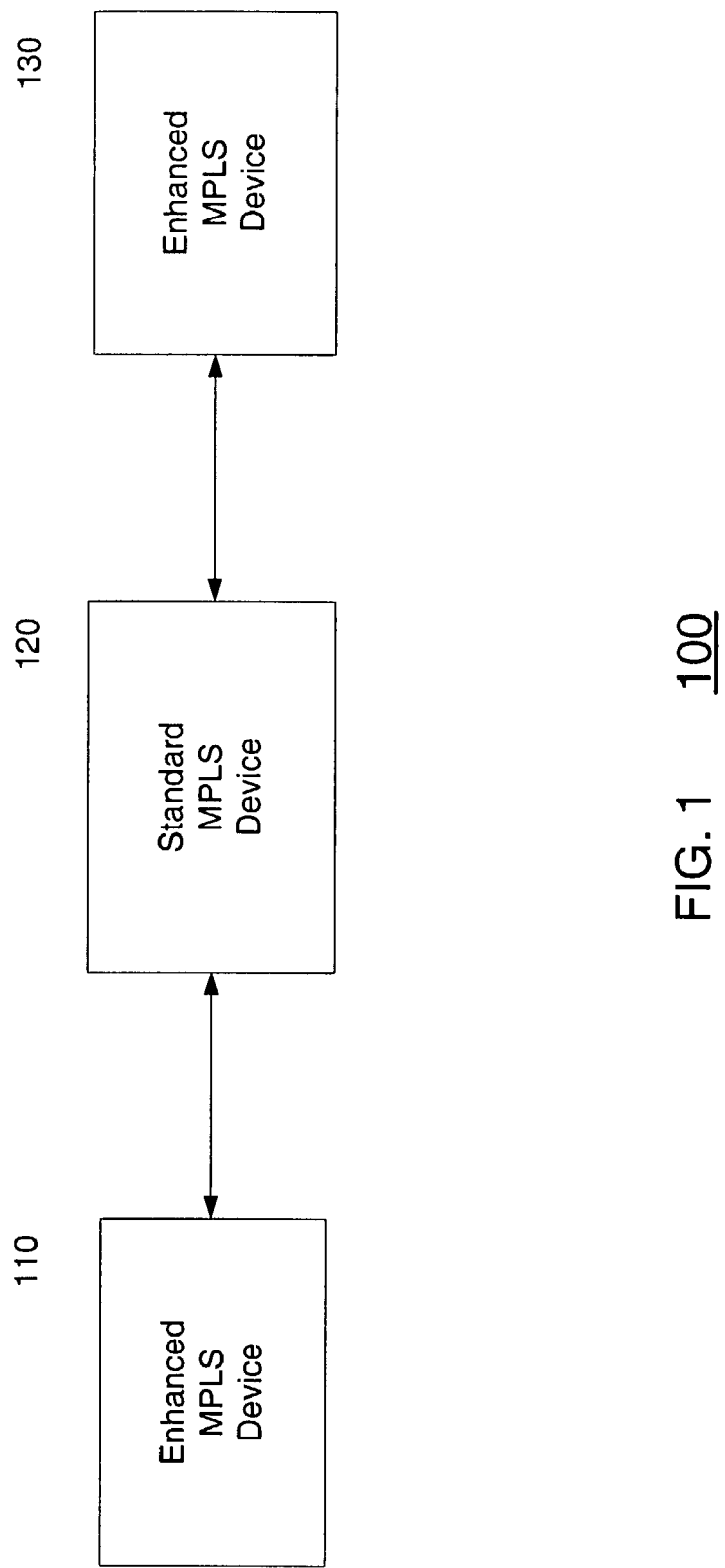
FIG. 1 is a block diagram showing an exemplary MPLS network in accordance with an embodiment of the present invention.

The present invention provides a mechanism for simultaneously supporting different classes of traffic as well as different levels of service within a single unified MPLS network under all operating conditions and without complex provisioning rules. The mechanism creates different service tiers, where each service tier corresponds to a particular class of traffic and level of service. The concept of service tier therefore encompasses the aspects of service availability and service quality experienced by different subscribers. For a given class of traffic, different service tiers offer different degrees of connection availability and quality (such as degree of bandwidth guarantees). In effect, then, the mechanism creates multiple sets of classes of traffic that can have different tariff costs. Traffic on LSPs of inferior service tiers is queued and handled separately from traffic on LSPs of premium service tiers. LSPs of inferior service tiers can be "bumped" to support LSPs of premium service tiers. By offering a variety of service tiers, a service provider can bid aggressively when dealing with low-end subscribers while also offering premium service to high-end subscribers and still use a single MPLS network.

Within the MPLS network, the service tier concept is implemented by certain MPLS devices, and specifically certain LSRs and LERs. For convenience, MPLS devices that include additional logic for supporting service tiers are referred to hereinafter as "enhanced" MPLS devices in order to differentiate them from "standard" MPLS devices that typically do not include additional logic for supporting service tiers. The enhanced MPLS devices perform certain signaling (described below) for establishing the service tiers as well as certain queuing and scheduling (described below) for implementing the service tiers. In order for the enhanced MPLS devices to interoperate with standard MPLS devices, this service tier signaling is preferably done in such a way as to pass transparently through standard MPLS devices. Furthermore, although the standard MPLS devices typically do not include additional logic for supporting service tiers, the standard MPLS devices may be configured in such a way that LSPs associated with the service tiers are handled in a manner that is consistent with the service tier concept (described below).

In an exemplary embodiment of the present invention, service tiers are preferably defined using a combination of LSP resource class (color) and LSP hold priority. Specifically, a set of resource classes (colors) T is set aside for use in signaling service tier. The set T is typically established via configuration on enhanced MPLS devices. All links that are usable by service tier LSPs are marked with the colors from the set T. The cost of these links is not constrained. Each service tier is associated with one color in set T and one hold priority, where the combination of color and priority is unique to a service tier. An LSP of a given service tier must be associated with the color and priority assigned to the service tier. The LSP may also be associated with colors not in set T. It should be noted that more than one service tier can use a particular hold priority. This allows two or more service tiers to have the same availability. For convenience, LSPs carrying traffic from a subscriber network using a service of a tier X are said to belong to service tier X.

In a typical embodiment of the present invention, the service tiers are signaled via standard MPLS protocols, such as RSVP-TE or CR-LDP. RSVP-TE is described in an Internet Engineering Task Force (IETF) Request for Comments (RFC) 3209 entitled RSVP-TE: Extensions to RSVP for LSP Tunnels, December 2001, which is hereby incorporated herein by reference in its entirety. CR-LDP is described in an Internet Engineering Task Force (IETF) Internet Draft draft-ietf-mpls-cr-ldp-06 entitled Constraint-Based LSP Setup Using LDP, November 2001, which is hereby incorporated herein by reference in its entirety.

In order to achieve differentiated treatment between service tiers, the signaling used to indicate service tier should ideally result in separation of LSPs of different service tiers in both enhanced and standard MPLS devices.

Within the portion(s) of the network where LSRs/LERs support service tiers, enhanced MPLS devices typically provide this separation of LSPs of different service tiers using a separate queue for each service tier. Specifically, when an enhanced MPLS device learns of the service tiers through the service tier signaling, the enhanced MPLS device typically establishes a separate queue for each service tier. The enhanced MPLS device typically queues traffic associated with LSPs that belong to a particular service tier separately from traffic on LSPs that do not belong to the same service tier. The enhanced MPLS device typically applies an appropriate scheduling discipline, such as a Weighted Fair Queuing (WFQ) scheduling discipline, to the different queues in to ensure a minimum bandwidth guarantee to each service tier.

Within the portion(s) of the network where LSRs/LERs do not support service tiers and on any links on the boundary of the network regions between enhanced and standard MPLS devices, link configuration rules are preferably used to provide this separation of LSPs of different service tiers. In any event, standard MPLS devices will be able to pass along the service tier signaling elements, thus enabling enhanced devices to operate effectively even when not directly adjacent.

Thus, it should be noted, the rules for administrating links is simpler in the portion(s) of the network where LSRs/LERs support service tiers. Within the portion(s) of the network where LSRs/LERs support service tiers, the network operator merely defines service tier (i.e., resource class and hold priority). In contrast, within the portion(s) of the network where LSRs/LERs do not support service tiers and on the boundaries of such regions, complex rules are required on link color, link cost, and link engineering in order to achieve separation of traffic for different levels of service.

With reference to an example with a premium "Gold" service and a non-premium service, certain links are reserved for premium service by marking them usable by LSPs with only the "Gold" color, assigning these links low link costs, and engineering these links to be sufficiently large to carry offered "Gold" LSPs, while other links are marked usable by both premium and non-premium services by marking them usable by both "Gold" LSPs and other color LSPs and assigning these links higher link costs in order to prevent their use by "Gold" LSPs under normal conditions.

Under normal operating conditions, LSPs of different service tiers are separated in the portion(s) of the network with enhanced MPLS devices, in the portion(s) of the network with standard MPLS devices, and along the boundaries between these areas.

Under failure conditions, LSP queue separation on service tier may be lost within and at the borders of regions that do not support service tiers if premium LSPs share links with non-premium LSPs due to preemption. However, LSP queue separation on a service tier is retained in portion(s) of the network that support service tier, even under failure.

FIG. 1 is a block diagram showing an exemplary MPLS network 100 in accordance with an embodiment of the present invention. Among other things, the MPLS network 100 includes two enhanced MPLS devices 110 and 130 that communicate through a standard MPLS device 120. The enhanced MPLS devices 110 and 130 include additional logic for supporting service tiers, while the standard MPLS device 120 typically does not include additional logic for supporting service tiers. The enhanced MPLS devices 110 and 130 signal service tier through a combination of resource class (color) and hold priority using a predetermined signaling protocol, such as RSVP-TE or CR-LDP. The signaling is transparent to the standard MPLS device 120. The standard MPLS device 120 is typically configured so as to separate traffic from different service tiers.

Figure 2:
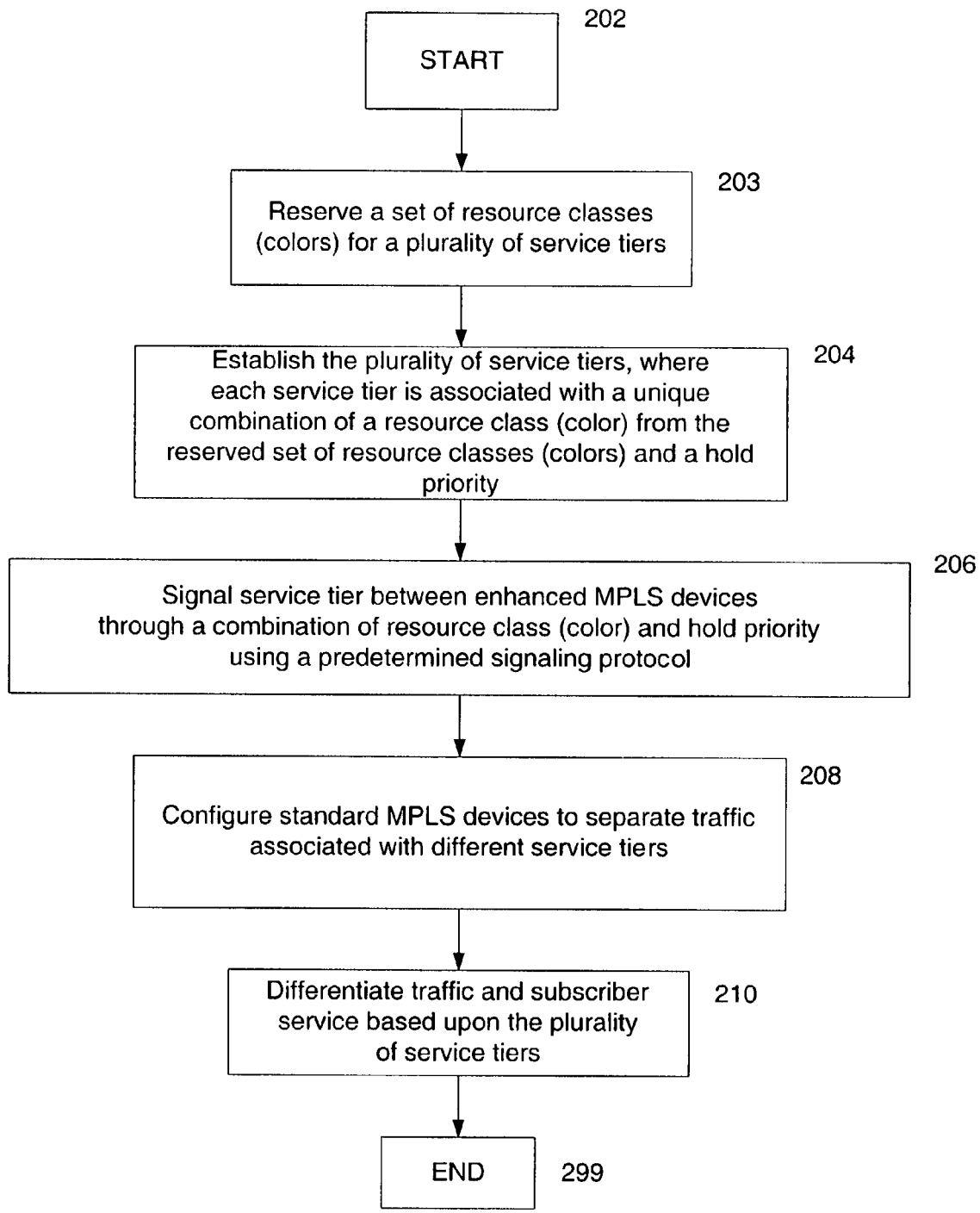
FIG. 2 is a logic flow diagram showing exemplary logic for supporting service tiers in accordance with an embodiment of the present invention.

FIG. 2 is a logic flow diagram showing exemplary logic 200 for supporting service tiers in accordance with an embodiment of the present invention. Beginning in block 202, a set of resource classes (color) is reserved for a plurality of service tiers, in block 203. The plurality of service tiers are established in block 204, where each service tier is associated with a unique combination of resource class (color) from the reserved set of resource classes (colors) and a hold priority. The service tiers are signaled between enhanced MPLS devices through a combination of resource class (color) and hold priority using a predetermined signaling protocol, such as RSVP-TE or CR-LDP, in block 206. Standard MPLS devices are configured to separate traffic associated with different service tiers, in block 208. Traffic and subscriber service is differentiated based upon the plurality of service tiers, in block 210. The logic terminates in block 299.

Figure 3:
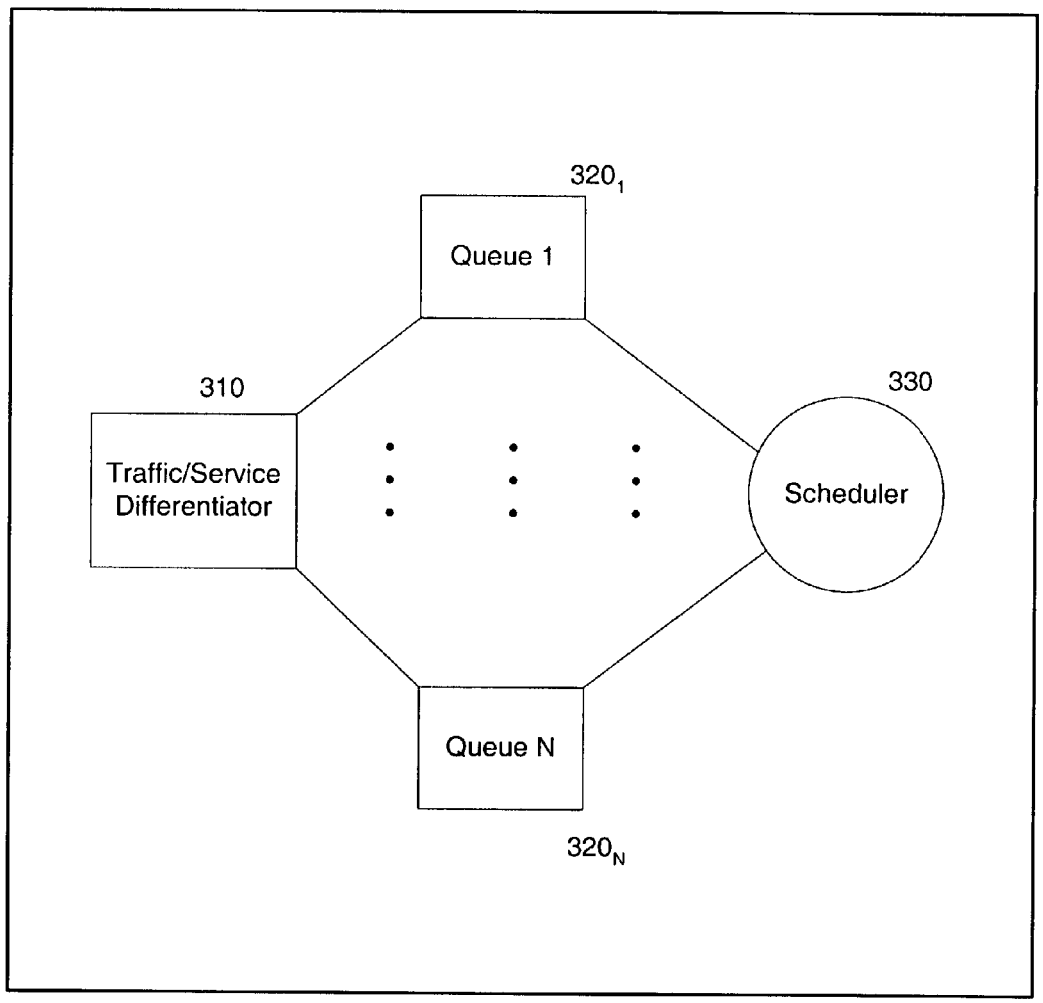
FIG. 3 is a block diagram showing the relevant components of an enhanced MPLS device in accordance with an embodiment of the present invention.

FIG. 3 is a block diagram showing the relevant components of an enhanced MPLS device 110 in accordance with an embodiment of the present invention. Among other things, the enhanced MPLS device 110 includes a traffic/service differentiator 310, a plurality of queues $320_1$–$320_N$, and a scheduler 330. The traffic/service differentiator 310 establishes a queue for each service tier, signals service tier using a predetermined signaling protocol such as RSVP-TE or CR-LDP, and separates traffic for different service tiers to a corresponding queue from the plurality of queues $320_1$–$320_N$. The scheduler 330 schedules transmission opportunities for the plurality of queues $320_1$–$320_N$ based upon a predetermined scheduling scheme, such as a weighted fair queuing scheduling scheme. The scheduler 330 typically provides at least a minimum bandwidth guarantee for each service tier.

FIG. 4 is a logic flow diagram showing exemplary traffic/service differentiator logic 400 in accordance with an embodiment of the present invention. Beginning in block 402, the logic establishes a queue for each service tier, in block 404. When the logic obtains a packet, in block 406, the logic determines a service tier for the packet, in block 408, and enqueues the packet in the queue corresponding to the service tier, in block 410. The logic typically determines the service tier for the packet based upon a combination of resource class (color) and hold priority, where each service tier is associated with a unique combination of resource class (color) and hold priority.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the traffic/service differentiator logic and scheduler logic is implemented as a set of computer program instructions that is converted into a computer executable form, stored as such in a computer readable medium, and executed by a microprocessor within the enhanced MPLS device under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A system for traffic and subscriber service differentiation using multiprotocol label switching (MPLS), the system comprising a plurality of MPLS devices, wherein a plurality of service tiers having different combinations of class of traffic and level of service are established and traffic is separated by at least one MPLS device based upon the plurality of service tiers, wherein a plurality of label switched path (LSP) resource classes (colors) are reserved for signaling the plurality of service tiers, and wherein each service tier is associated with a unique combination of a reserved resource class (color) and a hold priority.

2. The system of claim 1, wherein at least one LSP is established for each service tier, using a predetermined signaling protocol to signal the unique combination of reserved resource class (color) and hold priority for each LSP.

3. The system of claim 2, wherein the predetermined signaling protocol comprises a RSVP-TE signaling protocol.

4. The system of claim 2, wherein the predetermined signaling protocol comprises a CR-LDP signaling protocol.

5. The system of claim 1, wherein the plurality of MPLS devices comprises an enhanced MPLS device comprising a traffic/service differentiator for establishing a queue for each of the plurality of service tiers and separating traffic for each service tier into the corresponding queue.

6. The system of claim 5, wherein the enhanced MPLS device further comprises a scheduler for scheduling transmission opportunities for the queues.

7. The system of claim 1, wherein the plurality of MPLS devices comprises a standard MPLS device configured to separate traffic for each service tier.

8. The system of claim 1, wherein each label switched path (LSP) used for service tier traffic is associated with one and only one service tier.

9. The system of claim 1, wherein the plurality of service tiers support multiple levels of service for a single class of traffic.

10. A system for traffic and subscriber service differentiation using multiprotocol label switching (MPLS), the system comprising a plurality of MPLS devices, wherein a plurality of service tiers having different combinations of class of traffic and level of service are established and traffic is separated by at least one MPLS device based upon the plurality of service tiers, wherein the at least one MPLS device continues to separate traffic based upon the plurality of service tiers during a failure condition.

11. A device for traffic and subscriber service differentiation using multiprotocol label switching (MPLS), the device comprising: a plurality of queues, each queue associated with a different one of a plurality of service tiers having different combinations of class of traffic and level of service; a traffic/service differentiator operably coupled to separate traffic for the different service tiers into a corresponding queue of the plurality of queues; and a scheduler operably coupled to provide transmission opportunities for the plurality of queues wherein each service tier is associated with a unique combination of a resource class (color) from a reserved set of resource classes (colors) and a hold priority.

12. The device of claim 11, wherein the traffic/service differentiator is operably coupled to establish at least one LSP for each service tier using a predetermined signaling protocol to signal the unique combination of reserved resource class (color) and hold priority for each LSP.

13. The device of claim 12, wherein the predetermined signaling protocol comprises a RSVP-TE signaling protocol.

14. The device of claim 12, wherein the predetermined signaling protocol comprises a CR-LDP signaling protocol.

15. The device of claim 11, wherein the traffic/service differentiator continues to separate traffic for the different service tiers into a corresponding queue of the plurality of queues during a failure condition.

16. A method for traffic and subscriber service differentiation using multiprotocol label switching (MPLS), the method comprising: reserving a set of resource classes (colors) for a plurality of service tiers; establishing the plurality of service tiers, wherein each service tier is associated with a unique combination of a resource class (color) from the reserved set of resource classes (colors) and a hold priority; signaling service tier between enhanced MPLS devices through a combination of resource class (color) and hold priority using a predetermined signaling protocol; configuring standard MPLS devices to separate traffic associated with different service tiers; and differentiating traffic and subscriber service based upon the plurality of service tiers.

17. The method of claim 16, wherein the predetermined signaling protocol comprises a RSVP-TE signaling protocol.

18. The method of claim 16, wherein the predetermined signaling protocol comprises a CR-LDP signaling protocol.

19. The method of claim 16, wherein differentiating traffic and subscriber service based upon the plurality of service tiers comprises: establishing a separate queue for each service tier; and separating traffic into the separate queues based upon service tier.

* * * * *